Oct. 24, 1967  A. G. FORSHEE  3,348,386
APPARATUS AND METHOD FOR PUMPING AND STORING GASES
Filed Feb. 11, 1965
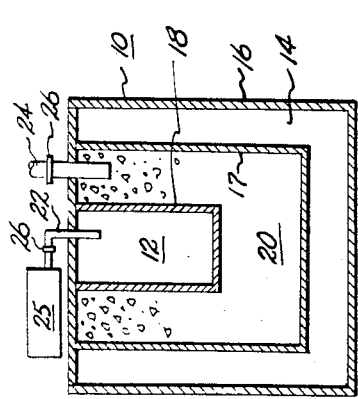
Fig. 1.
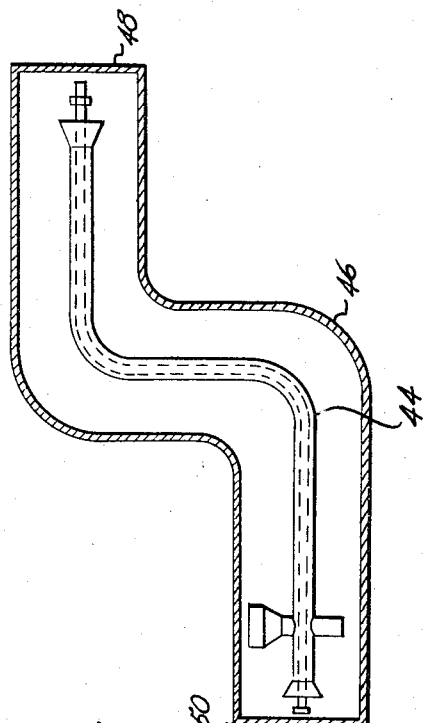
Fig. 2A.
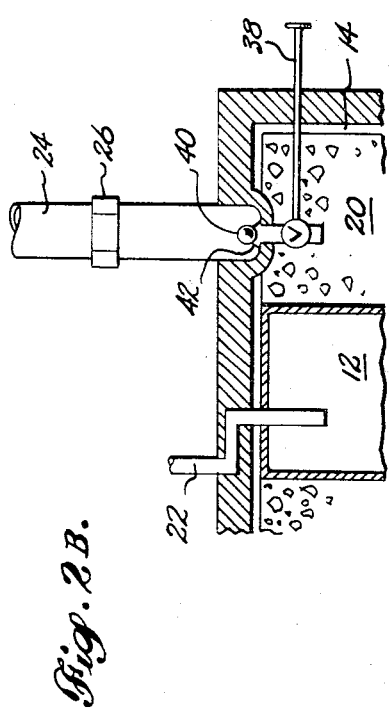
Fig. 2B.
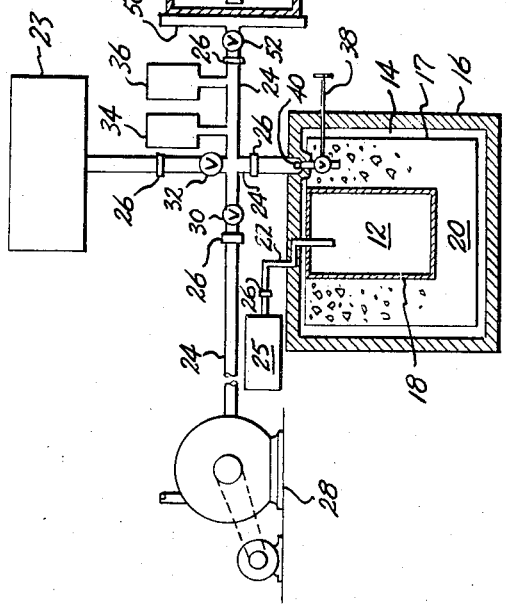
INVENTOR.
AMIEL G. FORSHEE
BY
ATTORNEY

United States Patent Office 3,348,386
Patented Oct. 24, 1967

3,348,386
APPARATUS AND METHOD FOR PUMPING AND STORING GASES
Amiel G. Forshee, Burien, Wash., assignor to The Boeing Company, Seattle, Wash., a corporation of Delaware
Filed Feb. 11, 1965, Ser. No. 431,878
6 Claims. (Cl. 62—48)

ABSTRACT OF THE DISCLOSURE

A pumping and storage apparatus for gases comprises a container enclosing means defining a cold trap and means defining a space within said container containing a gas absorption material, means for cooling said space, a conduit means interconnecting said space, a vacuum pump, a source of gas and a point of use of said gas and means for connecting and isolating said space from said vacuum pump, said source of gas and said point of use. A method of transferring a gas from one system to a second system comprises connecting the systems by conduit means having a valve means in said conduit means, removing the impurities from the conduit means, cooling a molecular sieve material contained within the second system, opening said conduit means thus allowing the molecular sieve material in said second system to absorb gas from the first system and closing the proper conduit valve means to isolate said second system from the first system.

---

This invention relates to means for the storage, transportation, and handling of gases. More specifically, it relates to a method and apparatus for storing and transporting gases and transferring gases from one system to another while maintaining maximum isolation of the gases from the surrounding environment.

A feature of the apparatus described herein is to provide a method capable of: (a) moving a gas to an area of usage; (b) recovering the gas again with minimum loss or contamination of the gas; and (c) storing the gas without detectable loss and without contamination of the surrounding environment. This apparatus and method can be used for any quantity of gas but would find its greatest application for small volumes of expensive and/or dangerous gases. Present systems do not provide for the storage and transfer of gas without loss or contamination of the gas as the instant invention provides. None of the prior art pumping systems having movable parts can pump a gas with the minimal components and/or contamination characteristics of the instant invention.

The instant invention finds particular utility in handling a gas such as krypton 85 where loss and contamination must be controlled due to cost and health considerations. Krypton 85 is both expensive and dangerous, being a radioactive gas; the gas finds particular utility in leak detection, especially in cryogenic systems now in use. The use of krypton 85 for leak detection has been limited to date because the means of using and recovering the gas with minimum loss or contamination of the gas did not exist.

Briefly, the instant invention comprises apparatus for storing and dispensing a gas to a point of use comprising a container enclosing means defining a cold trap and means defining a space within said container containing a material for gas adsorption, means for cooling said space, and a conduit interconnecting said space within said container with a vacuum pump, a source of gas, and a point of use for said gas, said conduit having means to operatively connect and isolate said space from said vacuum pump, said source of gas and said point of use as desired.

An object of the instant invention is to provide apparatus wherein a gas can be stored and shipped, used at a location, and returned to the apparatus for storage and/or further use.

A further object of the instant invention provides a method for the handling of a dangerous radioactive or other dangerous or expensive gas with essentially no loss or dilution of the gas. Briefly, the method of transferring a gas from a first system or source of a gas to a second system having a molecular sieve material for adsorbing the gas according to the teaching of the invention comprises the steps of: connecting the systems by at least one conduit, having at least one valve means; pumping impurities from said at least one conduit; cooling the molecular sieve material contained within the second system; opening the conduit and allowing the molecular sieve material within the second system to adsorb gas from the first system containing the gas; and closing the proper conduit valve means to isolate the second system from the first system.

A third object of the instant invention is to provide apparatus for the handling of a dangerous and/or expensive gas without loss of gas or contamination of the gas and the surrounding environment.

Additional objects and advantages of this invention will become apparent from the following disclosure with reference to the drawings wherein like components have been given like numeral designations.

In the drawings, FIGURE 1 is a cross-sectional view through the mid-plane of a storage container for storing gas.

FIGURE 2A illustrates the storage container of FIGURE 1 in combination with a pump, a cryogenic transfer line, and interconnecting conduits.

FIGURE 2B is a detail of a portion of the apparatus shown in FIGURE 2A.

Referring to FIGURE 1, a cross section of a container 10 is shown having a structural wall 16 enclosing means defining a cold trap 12, said last-mentioned means being structural wall 18 connected as by welding to wall 16 as shown. Wall 16 and wall 17 provide means defining a first space or vacuum chamber 14 used for insulation. The walls 16, 17 and 18 are designed to withstand pressure. The walls 17 and 18 provide means defining a second space 20 containing a molecular sieve material. The molecular sieve material may appropriately be any material such as activated charcoal or any material which will adsorb a gas being handled at low temperatures, and necessarily will not be a good adsorber at room temperature or above. Conduit 22 interconnects trap 12 and a source of cold material 25 to conveniently fill cold trap 12 with a coolant as desired. Means providing transfer of a gas from space 20, to an exterior point of use described in FIGURE 2A below, is provided by at least one conduit 24 having at least one coupling 26 and valves 30, 52 and 32, as seen in FIGURE 2A, respectively interconnecting space 20 with a pump 28 seen in FIGURE 2A, a point of gas use (flexible hose 46) seen in FIGURE 2A, or another container (not shown).

In FIGURE 2A, the exterior wall 16 is lined with lead to provide a shield against radiation in the operation whereby a radio-active gas is to be handled. A pump 28 operates to create a vacuum in chamber 20 which contains a sieve material. The pump 28 is connected to vessel 10 by conduit means 24 and can be isolated from vessel 10 by valves 30 and 38. Valve 32 permits transfer of gas to vessel 10 and space 20 through conduit 24 from a source 23 of gas or first system containing a gas. A vacuum gage 34 and a pressure gage 36 are provided, and are attached to conduit 24. Their operation is described below. In FIGURE 2B, the valve 38 maintains a radioactive or dangerous gas within space 20 for reasons to be described below; a lead ball 40 is fixed in its position as shown and supported by structure 42 having openings (not shown) through which the gas passes from space 20 into conduit 24 as valve 38 is opened. Since radiation occurs in straight lines, most of the radiation will be prevented by lead ball 40 from radiating through the non-lead-shielded conduit 24 from the lead-shielded space 20.

In FIGURE 2A, as noted above, conduit 24 interconnects space 20 within container 10 with a pump 28 and with a flexible hose 46. Conduit 24 contains a valve 30 to isolate space 20 from pump 28 when desired. Conduit 24 also conducts a gas from space 20 to flexible hose 46 containing a cryogenic transfer line 44 when desired, as will be described below. Normally, krypton 85, a radioactive gas, is used industrially to surround a cryogenic transfer line such as line 44. By the teachings of this invention any loss and/or contamination of the krypton 85 will be minimized in the handling of such a gas. The flexible hose 46 has a permanently sealed end 48. A detachable connection 50 connecting hose 46 and conduit 24 is provided at the opposite end of flexible hose 46.

In operation, with reference to FIGURE 2A, a first gas (an expensive or dangerous gas such as krypton 85) is initially transferred from a storage tank or first gas system 23 into a second system (space 20 of the container 10). In order to get the first gas into the second system (space 20) initially, the following is done: (1) space 20 is connected by conduit 24 to the first gas system 23. At this time valves 52 and 32 in conduit 24 are closed. (2) Vessel 10 is heated to the highest temperature possible without causing damage to gaskets, vessel 10 itself, valves, or molecular sieve material, and baked for 24 hours. The heating removes gases and contaminates foreign to the first gas from space 20. During this baking period valves 30 and 38 are opened and valves 52 and 32 are kept closed while pump 28 pumps down the conduit 24 and space 20, to aid in the removal of foreign gases and contaminates from conduit 24 and space 20. (3) When the desired vacuum is reached, pump 28 is valved off from space 20 by means of valve 30, after which vessel 10 is cooled to room temperature. A liquid gas (liquid nitrogen is used for most applications, but liquid helium or other gas might be required depending upon the molecular sieve temperature-adsorption curve) is transferred into the cold trap 12 from a liquid gas storage container 25 through conduit 22. (4) A period of approximately 30 minutes is allowed so that the molecular sieve material in space 20 will cool due to conduction from the cold trap 12. (5) Once the sieve material has cooled, valve 32 is opened to allow the first gas to flow from the higher pressure first gas system 23 into the second system (space 20) through conduit 24 and to be adsorbed by the sieve material in space 20. (6) When the pressure in the first gas system 23 and the line 24 between the first gas system and space 20 is 0.1 mm. Hg or lower, most of the gas will have been adsorbed onto the sieve material within space 20. Valves 32 and 38 are then closed. If first gas system 23 is a large supply, then only a part of the gas will be transferred to space 20.

The particular application of the apparatus of FIGURE 2A is to surround an X-20 cryogenic transfer line with a radioactive gas, such as krypton 85, and then recover the gas with essentially no loss or contamination of the gas or contamination of the surrounding environment. This is a specific application, but the method for getting a gas from space 20 to a point of use and subsequently recovering it is the same for many gases and applications.

Referring to FIGURE 2A, the operation of transferring a first gas (krypton 85) from a first system (space 20 in the steps below) to a second system, hose 46 in the steps below, is as follows: (1) Space 20 is connected to hose 46 by conduit 24 having valves 30 and 52 which are opened and valves 38 and 32 which are maintained closed. Pump 28 is then operated to pump down conduit 24 and the second system (flexible hose 46) to remove gases foreign to the first gas, so as to prevent contamination of the first gas, and to create a greater pressure difference between the first and second system, a pressure difference already existing due to the release of first gas molecules within space 20 by the molecular sieve material which has now warmed to room temperature. The coolant in trap 12 has been removed. As noted above, the sieve material, in warming to the temperature of vessel 10 environment, has released the gas from the sieve material into space 20 where it now exists under pressure. The pump 28 pumps the above conduit 24 flexible hose 46 system to 0.1 mm. Hg or lower. (2) The pump 28 is then isolated from space 20 and hose 46 by closing valve 30, leaving the conduit 24 and flexible hose 46 under vacuum and isolated. (3) Valve 38 is slowly opened and the radio-active gas which is in vessel 10 at room temperature and under pressure relative to the vacuum in conduit 24 bleeds through conduit 24 into flexible hose 46. (4) When the radioactive gas reaches the desired pressure in hose 46 as measured by gage 36, valve 38 on vessel 10 is closed off. The X-20 transfer line 44 is now surrounded by the radioactive gas at a specific desired pressure inside of flexible hose 46.

If it is desired to separate vessel 10 as a separate entity from the conduit 24 and the flexible hose 46 containing the radioactive gas: (1) isolate flexible hose 46 from conduit 24 by closing valve 52; (2) refill the cold trap 12 in vessel 10 with liquid gas and wait 30 minutes for the molecular sieve material in space 20 to cool down so that it will pump the gas remaining in conduit 24 by adsorption; (3) open valve 38; (4) when the pressure in conduit 24 has dropped to 0.1 mm. Hg or less due to the adsorption by the sieve material in space 20, valve space 20 off from conduit 24 by means of valve 38; (5) vessel 10 and flexible hose 46 are now isolated from the interconnecting conduit 24. Essentially, no radioactive gas remains in conduit 24. Conduit 24 can now be disconnected at the couplings 26, leaving conduit 24, flexible hose 46 and vessel 10 as separate units. The flexible hose 46 assembly containing the radioactive gas can now be left by itself, and the vessel 10 used for transferring gas to other points of use.

In operation for transferring the radioactive gas to vessel 10 from a point of use, in this case from flexible hose 46, the following steps are taken: (1) Assuming the flexible hose 46 assembly, conduit 24, and vessel 10 have been seperated, they are reassembled by means of appropriate couplings 26. The conduit 24 is evacuated to 0.1 mm. Hg or less by opening value 30 and pumping with pump 28. (2) Valve off pump 28 by valve 30 after achieving the desired vacuum in conduit 24. (3) Fill the cold tray 12 in vessel 10 with liquid gas and wait 30 minutes for the molecular sieve material in space 20 to cool down. (4) Open valve 38 on vessel 10 and valve 52 to flexible hose 46. (5) When the pressure in the flexible hose 46 and conduit 24 has dropped to 0.1 mm. Hg or less due to the pumping action (adsorption) of the sieve material in space 20, valve space 20 off from conduit 24 by valve 38.

The radioactive gas is now back in vessel 10. Essentially no contamination or loss of the radioactive gas took place during handling. As the liquid gas boils out (or is forced out) from vessel 10's cold trap 12 the pressure of the radioactive gas will increase. The reason for the pressure increase is that when the vessel 10 increases in temperature, the molecular sieve material increases in temperature as well, thereby releasing the gas within the means defined by walls 17 and 18, i.e., space 20, thereby increasing the pressure therein.

It is to be understood that an external insulating wrapping material for vessel 10 can be used instead of a chamber 14 having a vacuum. It is to be understood, likewise, that where a gas is to be handled having a relatively high freezing point, a molecular sieve material is not necessary. In the latter case, a high surface area cold trap 12 could be used to condense the gas (i.e., cryo pumping).

This method would not be as desirable as using a molecular sieve material due to the relatively small surface area available in space 12.

Since numerous changes may be made in the above apparatus and different embodiments may be made without departing from the spirit thereof, it is intended that all matter contained in the foregoing description referring to apparatus or method or shown in the accompanying drawings shall be interpreted as illustrative and not in a limiting sense.

I claim:

1. Apparatus for storing, dispensing and recovering a gas comprising:
   (a) a container;
   (b) means for defining a space within said container containing a material for gas adsorption;
   (c) means for cooling said space; and
   (d) a conduit interconnecting said space within said container with a vacuum pump, a source of gas, and a point of use for said gas, said conduit having means to operatively connect and isolate said space from said vacuum pump, said source of gas, and said point of use as desired, said conduit being isolated from said means for cooling said space.

2. Apparatus for storing krypton 85, transferring krypton 85 to a flexible hose surrounding a cryogenic transfer line, and recovering the krypton 85, comprising:
   (a) a container having an exterior structural wall and an interior structural wall for defining a first space within which a partial vacuum is maintained;
   (b) means including said interior structural wall for defining a second space and a cold trap;
   (c) first conduit means interconnecting said cold trap and a liquid-gas storage container;
   (d) a molecular sieve material disposed within said first space for adsorbing krypton 85; and
   (e) second conduit means interconnecting said first space within said container with a vacuum pump, a source of krypton 85, and the flexible hose, said second conduit means having a plurality of valves to operatively connect and isolate said first space from said vacuum pump, said source of krypton 85 and the flexible hose as desired.

3. The apparatus defined in claim 2 wherein said exterior structural wall has a lead lining for preventing radiation from the enclosure to the exterior environment.

4. The method of transferring a first gas from a first system containing the first gas to a second system having a molecular sieve material for adsorbing the first gas comprising the steps of:
   (a) connecting the systems by at least one conduit having at least one valve;
   (b) removing substantially all gas molecules foreign to the first gas from said at least one conduit having at least one valve so as to prevent contamination of the first gas by the foreign gas molecules;
   (c) cooling the molecular sieve material contained within the second system;
   (d) opening the conduit valve and allowing the molecular sieve material within the second system to adsorb the first gas from the first system containing the first gas; and
   (e) closing the conduit valve to isolate the second system from the first system.

5. The method of transferring a first gas from a first system having a molecular sieve material for adsorbing the first gas to a second system comprising the steps of:
   (a) connecting the systems by at least one conduit having at least one valve;
   (b) removing substantially all gas molecules foreign to the first gas from the second system and said at least one conduit so as to prevent contamination of the first gas by the foreign gas molecules and to create a greater pressure difference between the first and second system whereby the pressure in the second system is at a lower pressure than the first system;
   (c) opening the conduit valve and allowing the gas to flow into the second system having the lower pressure; and
   (d) closing off the systems by means of the conduit valve.

6. Apparatus for storing, dispensing and recovering a first gas comprising:
   (a) a container having an exterior structural wall and an interior structural wall for defining a first space within which a partial vacuum is maintained;
   (b) means including said interior structural wall for defining a second space for a cold trap;
   (c) first conduit means interconnecting said cold trap and a liquid-gas storage container;
   (d) a molecular sieve material disposed within said first space for adsorbing said first gas; and
   (e) second conduit means interconnecting the first space within said container with a vacuum pump, a source of the first gas, and a flexible hose, said second conduit means having a plurality of valves to operatively connect and isolate said first space from said vacuum pump, said source of first gas and the flexible hose as desired.

References Cited

UNITED STATES PATENTS

| | | | |
|---|---|---|---|
| 2,663,626 | 12/1953 | Spangler | 62—48 X |
| 2,712,730 | 7/1955 | Spangler | 62—48 X |
| 2,895,303 | 7/1959 | Streeter | 62—514 |
| 3,195,620 | 7/1965 | Steinhardt | 62—514 X |
| 3,250,079 | 5/1966 | Davis et al. | 62—514 |
| 3,252,291 | 5/1966 | Eder | 62—514 X |

M. CAREY NELSON, *Primary Examiner.*

S. SCOTT, *Assistant Examiner.*